United States Patent Office 3,061,481
Patented Oct. 30, 1962

3,061,481
PRODUCTION OF METAL ARTICLES WITH
HOLES IN THEM
Campbell Clouston Horne, Giffnock, and George Robert
Stuart, Thornliebank, Glasgow, Scotland, assignors to
The International Nickel Company, Inc., New York,
N.Y., a corporation of Delaware
Filed May 6, 1957, Ser. No. 657,453
Claims priority, application Great Britain May 8, 1956
7 Claims. (Cl. 148—4)

The invention relates to the removal of filler material from formed bodies and, more particularly, to the removal of acid soluble filler material from small filled passages in heat resistant metal articles.

It is well known that one method of producing metal articles with holes in them is first to produce a billet or the like with one or more filled holes in it, then to shape the billet or the like by extrusion or otherwise, the filler being simultaneously distorted, and thereafter to remove the filler. Usually, the filler, and, therefore the hole containing it, is considerably elongated and reduced in cross-sectional area during the shaping step. The foregoing method can be applied to the production of hollow turbine blades from nickel-chromium heat resistant alloys, a billet of the alloy being drilled to form circular holes; thereafter the billet with filled holes is extruded to aerofoil shape.

The usual method of removing the filler is to leach it out of the hole by an acid solution which attacks the filler but not the main alloy, or at least attacks the filler preferentially. Fillers having suitable characteristics of deformation which enable them to be used in nickel-chromium alloys and leached by appropriate acids include iron-manganese-titanium alloys, as described and claimed in U.S. application Serial No. 509,380, now U.S. Patent No. 2,891,307, and sintered compositions of iron and magnesia, as described and claimed in U.S. application Serial No. 472,755, now U.S. Patent No. 2,941,281. The leaching operation proceeds very slowly and our object is to accelerate it. We have observed that filler material in a hole which is of small diameter and long compared with its diameter sometimes produces a stable bubble structure in the hole during leaching and the leaching action may then be brought to a standstill. In cases where the cross section is circular a single bubble may extend completely across the hole.

It has now been discovered that by modifying the leaching operation, the formation of a stable bubble system may be substantially avoided and the leaching operation is accelerated.

It is an object of the present invention to provide an improved process for the leaching of filler material from filled passages in heat resistant metal objects.

Another object of the present invention is to provide a novel filler material specifically adapted to provide improved conditions of leaching.

A further object of the present invention is to provide a process for the production of the novel filler material.

Other objects and advantages will become apparent from the following description taken in conjunction with the accompanying drawing in which.

Figure 1:
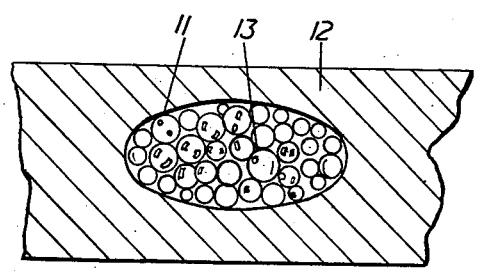
FIGURE 1 depicts an unstable bubble system in a minute passage in a heat resistant hollow body.

Generally speaking, the present invention contemplates an improvement in the process of leaching acid soluble filler material from a filled passage in heat resistant metal, which comprises providing in the leached portion of said passage a substantially insoluble elongated body having a cross-sectional area substantially less than the cross-sectional area of the passage. The elongated body may be provided in the leached passage or hole either in conjunction with the filler material, or during the leaching operation so that it trails the filler material as the filler material is being eaten away by the acid.

The present invention also contemplates a novel composite filler material which comprises a substantially elongated mass, e.g., rod, of substantially coherent acid soluble filler material containing core or cores of acid insoluble filler material. This core(s) extends substantially the entire length of the elongated mass or rod. The core(s) has a cross-sectional area substantially less than the elongated mass or rod so that the acid soluble filler material forms a sheath around the core. This novel filler material is conveniently made by extrusion in the manner disclosed hereinafter.

Particularly advantageous results in improved leaching time are obtained when the elongated body or core destroys the symmetry of the hole or passage. It may be said that the symmetry of a hole will be destroyed if, when cross sections of the cored hole are cut longitudinally by random planes through the center of the section, all the segments of the lines formed by the intersection of the longitudinal planes with the cross-sectional planes are not of equal length across the leached area and/or the area to be leached. The elongated body or core may destroy the symmetry of the hole or passage by either its position with respect to the walls of the passage or hole or by its dissimilar shape or by both. An instance of positional destruction of symmetry is the eccentric placing of a core in a hole, e.g., an eccentrically placed round core in a round hole. An example of destruction of symmetry by dissimilar shape would be placing a shaped core in a hole of different shape, e.g., placing a central core of square cross section in a round hole. When a core is placed in a hole so that random motion of the core is permitted, the total effect will be a destruction of symmetry which at any given moment may be due to either one or both of the aforementioned structural configurations. Even when a symmetric system of cores is used in a filler a large number of asymmetrical zones of action may be formed in relation to the central part of the filler and passage or hole.

In carrying the invention into practice, it is preferred to render the bubble structure in the leached portion of a filled passage unstable by inserting a wire in the hole. This wire should, of course, be as little attacked by the leaching solution as the main alloy, and it may consist of that or a similar alloy, or may be nonmetallic. The wire may be free and descend the hole under gravity as the filler is leached out. Alternatively, it may be mechanically agitated, though this is not necessary if the leaching of the filler material produces vigorous bubbling.

Preferably, the cross-sectional area of the wire should not exceed about 25% of the cross-sectional area of the passage.

As was disclosed hereinbefore, the wire may be a core in the filler. A filler rod may be manufactured by drilling a billet of filler material and inserting in the drilled billet an acid-resisting plug or core. The whole may be reduced in section substantially axially with respect to the core (e.g., by extrusion or drawing) to any required size for insertion in a drilled hole in a billet from which a turbine blade or other article is to be formed. It is to be observed that the acid-resisting or acid insoluble plug or core may have substantially the same deformation characteristics as the mass of filler material, and a melting temperature high enough to withstand extrusion. The plug or core which is drawn down to a wire in the filler rod may be inserted eccentrically in the original billet so that the space in which bubbles can ultimately form will be asymmetrical. Alternatively a plurality of cores may be placed in the filler rod to provide a number of zones of local action. Such asymmetry is desirable between each core and the filler area, since we believe any bubble system is best rendered unstable by avoiding symmetry in the space in which it is formed. If the wire is free to move or is mechanically agitated, asymmetry is practically ensured. A wire forming part of a filler rod, however, will remain stationary during the leaching and may advantageously be eccentric.

Figure 2:
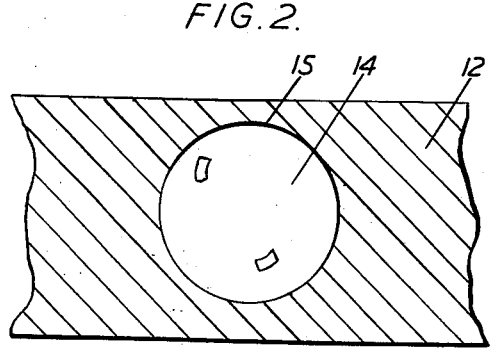
FIGURE 2 illustrates a stable bubble system in a passage of circular cross section in a heat resistant metal.
Figure 3:
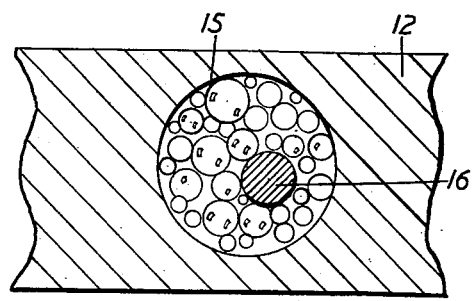
FIGURE 3 depicts a passage of circular cross section in a heat resistant metal showing an unstable bubble system induced in accordance with the invention under the conditions which normally would tend to create a stable bubble system.

The accompanying drawing depicts in FIGURE 1 a pseudo-elliptical asymmetric hole 11 in a heat-resistant body 12 which contains an unstable bubble system 13. The single bubble 14 in the circular hole 15, in FIGURE 2 illustrates the disadvantage of the symmetrical passage. When such a bubble as illustrated here forms, it is impossible for additonal leaching fluid to enter the hole until the bubble is released. Accordingly, the leaching action is halted when the bubble forms. The wire or smaller elongated body 16 shown in FIGURE 3, induces the formation of the unstable bubble system. It is believed that the wire promotes asymmetry, particularly when it is in an eccentric position with regard to the hole and that the consequences of the asymmetry is to induce unstable bubbles to form. Mechanical agitation of wire 16 practically assures asymmetry. Of course, the use of the wire is not limited to holes of circular cross section, but may advantageously be used in holes of any cross-sectional shape.

For the purpose of giving those skilled in the art a better understanding of the invention and/or a better appreciation of the advantages of the invention, the following illustrative example is given:

Example 1

A circular hole in a heat resistant metal mass is filled with a filler material having a composition substantially 88% iron, 10% manganese and 2% titanium. The filler containing an asymmetrically disposed core of a material having a composition substantially 78% nickel, 6% iron, 14% chromium. The metal mass containing the filler is reduced to give a filled circular passageway 2 mm. in diameter and 127 mm. in length. The core is approximately 0.16 mm. in diameter. The filler material is leached from the filled passageway by boiling acid as stated below at a rate of 4.8 mm. per hour the passage being completely cleared. Using a filler reduced to give a filled circular passageway 2 mm. in diameter and 127 mm. in depth containing 9 cores of 0.16 mm. the filler was leached at a rate of 26.4 mm. per hour the passageway being completely cleared.

In contrast, a circular hole in a heat resistant metal mass is filled with a filler material having a composition substantially 88% iron, 10% manganese and 2% titanium. The metal mass containing the filler material is reduced so that a filled circular passage 2 mm. in diameter and 127 mm. in depth is produced. The filler material is leached from the filled passage by boiling acid having a composition comprising 25 parts of commercial nitric acid by volume to 1 part commercial hydrochloric acid by volume and water to make up 100 parts. The boiling temperature is about 105° C. The depth to which this passage was leached in 100 hours was 75 mm. and leaching then became infinitely slow. Thus without the use of the elongated mass provided by the present invention a leaching rate of only 0.75 mm./hr. is obtained.

The present invention is particularly applicable to the production of hollow metal objects containing substantially small or minute passages, and more particularly, to the production of hollow metal objects such as, inter alia, turbine blades, nozzle guide vanes, compressor blades, thin wall hypodermic tubes and pitot tubes.

It is to be observed that the term "heat resistant metal alloy" is used to include austentic nickel-chromium alloys, including nickel-chromium-iron and nickel-chromium-cobalt and cobalt-chromium alloys including cobalt-chromium-iron alloys, which contain a total of at least about 25% nickel plus chromium, cobalt plus chromium, or nickel plus chromium plus cobalt in addition to small amounts of aluminum, titanium, molybdenum, tungsten, niobium, tantalum, silicon, manganese, zirconium and boron which may optionally be present in the alloys. These alloys are adapted to be subjected in use to temperature up to about 700° C. or above and, accordingly, must be hot worked at temperatures around 1200° C.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. An improved process for removing metal-containing filler material from a small filled passage in a metal object made of a heat-resistant alloy selected from the group consisting of nickel-chromium alloys and cobalt-chromium alloys which comprises subjecting said filler material to the action of a leaching acid and positioning a coherent, elongated body, insoluble in said acid in the leached portion of said passage during leaching to destroy the cross-sectional symmetry of said passage and accelerate leaching.

2. An improved process for removing metal-containing filler material from a small filled passage in a metal object made of a heat-resistant alloy selected from the group consisting of nickel-chromium alloys and cobalt-chromium alloys which comprises subjecting said filler material to the action of a leaching acid and positioning a coherent, elongated body, insoluble in said acid and having a cross-sectional area substantially less than about 25% of the cross-sectional area of said passage, in the leached portion of said passage during leaching to destroy the cross-sectional symmetry of said passage and accelerate leaching.

3. A new article of manufacture comprising an extruded mass of heat-resistant metal having passages filled with filler and at least one core in said filler in each of said passages, said heat-resistant metal being selected from the group consisting of nickel-chromium alloys and cobalt-chromium alloys, said passages in said extruded mass of heat-resistant metal being filled with leachable filler soluble in a leaching acid and said at least one core in the filler in each of said passages being of coherent material insoluble in said leaching acid, extending substantially the length of said filler and at any point not exceeding about 25% of the cross-sectional area of said filler.

4. An article as defined in claim 3 having a plurality of cores in the filler in each of said passages.

5. An article as defined in claim 3 having an eccentric core in the filler in each of said passages.

6. An article as defined in claim 3 having a wire core made of an alloy selected from the group consisting of nickel-chromium alloys and cobalt-chromium alloys.

7. An improved process for removing metal-containing filler material from a small filled passage in a metal object made of heat-resistant alloy selected from the group consisting of nickel-chromium alloys and cobalt-chromium alloys which comprises subjecting said filler material to the action of a leaching mineral acid while a coherent, elongated body, insoluble in said mineral acid and having a cross-sectional area substantially less than about 25% of the cross-sectional area of said filled passage, positioned with relation to said passage such that said coherent, elongated body is present in at least the leached out portion of said passage during leaching, destroys the cross-sectional symmetry of said passage whereby the rate of leaching is accelerated compared to the rate of leaching occurring in the absence of said coherent, elongated body.

References Cited in the file of this patent
UNITED STATES PATENTS

| | | |
|---|---|---|
| 1,246,694 | Wood | Nov. 13, 1917 |
| 2,074,007 | Wissler | Mar. 16, 1937 |
| 2,169,937 | Wempe | Aug. 15, 1939 |
| 2,362,875 | Zahn | Nov. 14, 1944 |
| 2,446,672 | Sirp | Aug. 10, 1948 |
| 2,499,977 | Scott | Mar. 7, 1950 |
| 2,628,166 | Haller | Feb. 10, 1953 |

UNITED STATES PATENT OFFICE
CERTIFICATE OF CORRECTION

Patent No. 3,061,481 October 30, 1962

Campbell Clouston Horne et al.

It is hereby certified that error appears in the above numbered patent requiring correction and that the said Letters Patent should read as corrected below.

Column 3, line 35, for "additonal" read -- additional --; line 62, for "length" read -- depth --; column 4, lines 27 and 28, for "temperature" read -- temperatures --; column 6, under "References Cited", after line 16, insert the following:

FOREIGN PATENTS 765,199 Great Britain ----- Jan. 2, 1957

Signed and sealed this 25th day of June 1963.

(SEAL)
Attest:

ERNEST W. SWIDER
Attesting Officer

DAVID L. LADD
Commissioner of Patents